(12) United States Patent
Stephens et al.

(10) Patent No.: US 10,845,244 B2
(45) Date of Patent: Nov. 24, 2020

(54) COMMON PATH INTERFEROMETERS SPECTROMETER WITH A FOCUSING INPUT

(71) Applicant: Keit Limited, Didcot (GB)

(72) Inventors: Timothy John Stephens, Oxford (GB); James Paul Sobol, Oxford (GB)

(73) Assignee: Keit Limited, Didcot (GB)

( * ) Notice: Subject to any disclaimer, the term of this patent is extended or adjusted under 35 U.S.C. 154(b) by 0 days.

(21) Appl. No.: 16/325,581

(22) PCT Filed: Aug. 17, 2017

(86) PCT No.: PCT/GB2017/052437
§ 371 (c)(1),
(2) Date: Feb. 14, 2019

(87) PCT Pub. No.: WO2018/033741
PCT Pub. Date: Feb. 22, 2018

(65) Prior Publication Data
US 2019/0178715 A1    Jun. 13, 2019

(30) Foreign Application Priority Data
Aug. 19, 2016   (GB) .................................. 1614185.5

(51) Int. Cl.
*G01J 3/453* (2006.01)
*G01J 3/02* (2006.01)

(52) U.S. Cl.
CPC ........... *G01J 3/4532* (2013.01); *G01J 3/0208* (2013.01); *G01J 3/0256* (2013.01); *G01J 3/453* (2013.01); *G01J 3/4531* (2013.01)

(58) Field of Classification Search
CPC ........ G01J 3/4532; G01J 3/453; G01J 3/0256; G01J 3/4531; G01J 3/0208
See application file for complete search history.

(56) References Cited

U.S. PATENT DOCUMENTS

| 5,495,334 A | 2/1996 | Nagoshi et al. |
| 5,898,498 A | 4/1999 | Kirk |

(Continued)

FOREIGN PATENT DOCUMENTS

| EP | 0468816 A2 | 1/1992 |
| WO | WO 2011/086357 A1 | 7/2011 |

OTHER PUBLICATIONS

European Patent Office, International Search Report in International Patent Application No. PCT/GB2017/052437, 3 pp. (dated Dec. 8, 2017).

(Continued)

*Primary Examiner* — Hwa Andrew Lee
(74) *Attorney, Agent, or Firm* — Leydig, Voit & Mayer, Ltd.

(57) ABSTRACT

A common path interferometer is disclosed. The interferometer is arranged to divide an input beam into first and second beam portions directed in opposite directions around a cyclic path to form an interference pattern at a detector. The cyclic path is defined by at least two mirror regions curved in the plane of the cyclic path, such that the interference pattern represents path difference variations between the first and second beam portions. The interferometer further includes an input optic arranged in the beam path before division of the input beam into the beam portions. The input optic is configured to provide convergence to reduce the extent transversely to the plane of the cyclic path of the interference pattern at the detector. The beam and beam portions have different convergence requirements in the plane of, and transverse to the plane of, the cyclic path, which are addressed separately by the mirror regions and the input optic.

44 Claims, 8 Drawing Sheets

(56) References Cited

U.S. PATENT DOCUMENTS

2004/0114148 A1\* 6/2004 Agladze ................ G01J 3/0259
356/456
2012/0281223 A1\* 11/2012 Mortimer ............. G01B 9/0209
356/456

OTHER PUBLICATIONS

European Patent Office, Written Opinion in International Patent Application No. PCT/GB2017/052437, 6 pp. (dated Dec. 8, 2017).
United Kingdom Intellectual Property Office, Search Report in United Kingdom Patent Application No. GB1614185.5, 3 pp. (dated Jan. 27, 2017).

\* cited by examiner

COMMON PATH INTERFEROMETERS SPECTROMETER WITH A FOCUSING INPUT

CROSS-REFERENCE TO RELATED APPLICATIONS

This application is a national phase application of International Patent Application No. PCT/GB2017/052437, filed Aug. 17, 2017, which claims priority to Great Britain Patent Application No. GB 1614185.5, filed Aug. 19, 2016, both of Which are incorporated by reference herein in their entireties for all purposes.

FIELD OF THE INVENTION

The present invention relates to a compact interferometer. The interferometer is a Fourier transform spectrometer and is configured based on Sagnac spectrometer geometry such that it may have no moving parts.

BACKGROUND

The most common design of Fourier transform interferometer is the Michelson interferometer. A Michelson interferometer, such as shown in FIG. 1, comprises a beamsplitter 10 and a pair of mirrors 21, 22. The beamsplitter 10 divides the light into two beam portions. The mirrors 21, 22 and beamsplitter 10 are arranged so that light passes along two linear paths, namely legs 31, 32. Each beam portion travels a return path along a different one of the legs. The optical path length along one of the legs 32 is adjustable. The beam portions recombine at a focal plane to form fringes 55. The beam portions may be focussed through a lens 40, arriving at the lens at equal angles of inclination. By displacing one of the reflecting mirrors 22 in the direction of the beam, the optical path difference between the two legs can be varied. The fringes 55 usually take the form of concentric rings. As the path difference is changed the separation between fringes becomes greater or smaller. If the path length difference is varied linearly with time, and a detector 50 is placed at the centre of the annuli of fringes 55, the signal from the detector will vary sinusoidally with a period determined by the wavelength and path difference.

Another design of Fourier transform interferometer is the Sagnac interferometer, as shown in FIG. 2. The Sagnac interferometer also comprises a beamsplitter 110, and a pair of mirrors 121, 122. The beamsplitter divides the light, as for the Michelson interferometer, but instead of the two beam portions travelling along linear legs and being reflected directly back to the beamsplitter 110, they are instead reflected to the other mirror 121 or 122. Hence, the beam portions travel along similar cyclic paths but in opposite directions. For this reason the Sagnac interferometer is sometimes known as a common path interferometer. The two beam portions exit via the beamsplitter 110 and recombine at detector 150 to produce fringes 155. Different to the Michelson, the fringes 155 are linear rather than circular.

The Sagnac interferometer is more tolerant to the positioning of the mirrors than the Michelson interferometer. The Sagnac device is more tolerant because the path difference is produced as a result of the triangular path of the beams being asymmetric and therefore vibrations or variations will affect both beams equally which will tend to cancel each other out at the interference fringes.

WO 2011/086357 describes a Sagnac type interferometer such as that shown in FIG. 3. In this arrangement the flat or plane mirrors 121 and 122 are replaced with curved mirrors 221 and 222. The curved mirrors provide focussing of the two beam portions on the detector 250. A spatial interferometric signal is formed at the detector. WO 2011/086357 is hereby incorporated by reference herein.

In spectrometers it is common to employ a beam shaping optic such as a refractive element immediately before the detector and after the interferometer in order to control the beam incident on the detector. In the spectrometer of WO2011/086357 such a solution is problematic for a number of reasons. Firstly the interferometer is particularly compact so there is little physical space, and secondly refractive optics introduce a wavelength dependence when used over a wide spectral range.

SUMMARY OF THE INVENTION

The present invention is directed to improvements in the interferometer described in the prior art. The folded-Sagnac geometry offers advantages in terms of compact size and stability but introduces challenges in terms of how the area of the detector can be best filled and how the quality of the interferogram can be maintained while maximising the optical signal on the detector.

As mentioned above, the spectrometer provides a spatial interferometric signal which provides spectral information. A Michelson interferometer usually requires movement of one of the mirrors to change the interference pattern and allow the spectral information to be obtained. For the present spectrometer the spatial interferogram provides the spectral information spatially across the detector without requiring movement.

For the spatial interferogram of the present spectrometer it is desirable to maximise the optical power collected onto the detector to maximise the signal to noise ratio in a given collection time. Enhanced signal to noise ratio allows faster processing at a given measured signal fidelity. The dimensions and array size of the detector are limited by commercially available detectors. Therefore it is desirable to optimise the optical beam shape on the detector to minimise power loss, such as caused by power missing the detector, as well as maximising or optimising the number of detector elements that are illuminated.

To achieve these objectives and to maximise the optical power collected on the detector the input light beam is focussed independently in each axis to optimise the beam extent.

The present invention provides an interferometer arranged to divide an input beam into first and second beam portions directed in opposite directions around a cyclic path to form an interference pattern between the first and second portions at a detector surface. The interferometer arrangement is often known a common path interferometer because the beam portions travel along approximately (although not exactly) the same paths, for example, the beams travel via, or encounter, the same components or surfaces but in opposite directions, that is, in an opposite order. The beam portions are counter-propagating. The arrangement of the common path interferometer is different to a Michelson interferometer. In a Michelson interferometer the beam portions travel along different paths and are reflected by different mirrors at the end of each leg. For this reason Michelson interferometers are known as double path interferometers. The interferometer of the present invention may also be known as a counter-cyclic interferometer because the beam portions traverse opposing almost closed loop paths. The interferometer is based on Sagnac interferometer geometry.

In the present invention, the cyclic path is defined by at least two mirror regions curved in the plane of the cyclic path, such that the interference pattern represents path difference variations between the first and second beam portions across the detector surface in the plane of the cyclic path. By the term "cyclic path" we mean a path relating to a closed or near-closed loop type path. In the present configuration one of the beam portions may cross itself thereby forming a closed-loop whereas the other beam may not quite meet itself as it passes around the components.

The interferometer further comprises an input optic or collapsing/focussing optic which is located in the beam path before division of the input beam into the first and second beam portions. The input optic is configured to provide convergence to control or reduce the extent, orthogonally or transversely to the plane of the cyclic path, of the interference pattern at the detector surface. Thus, the input optic provides convergence to the beam (or interference pattern) in a first direction only across the beam, whereas the two mirror regions curved in the plane of the cyclic path provide convergence in a second direction only across the beam, orthogonal or transverse to the first direction. An input beam may be circular, elliptical, square or rectangular and may be considered to have a cross-section which is determined by orthogonal dimensions, such as width of the beam or the beam dimension in the in-plane direction, and a height of the beam or the beam dimensions in the out-of-plane direction. Similarly, in-plane and out-of-plane dimensions may be determined for interference pattern at the detector. The dimension or extent of the beam may be taken to be a percentage of the beam intensity or for example, where the intensity has dropped to 1/e2 of its maximum or on axis value.

The input optic may be curved in a direction transverse to the plane of the cyclic path but may not be curved in a direction parallel to the plane of the cyclic path, whereas the two mirror regions may be curved in a direction parallel to the plane of cyclic path but may not be curved in a direction transverse to the plane of the cyclic path. Thus, the input optic and mirror regions provide convergence to the beam to meet different requirements. The input optic provides convergence out of the plane of the cyclic path such that in this out-of-plane direction the beam is converged to the desired extent at the detector, whereas the mirror regions bring the first and second beam portions to a focus in an in-plane direction of the cyclic path in such a way that the beam portions are brought to a focus as they traverse around the cyclic path. Hence, the different transverse focussing requirements for in-plane and out-of-plane directions are provided separately by the mirror regions and the input optic respectively.

In a preferred arrangement, the input optic may be arranged to provide convergence across the beam in a direction transverse to the plane of the cyclic path and substantially only in this direction, whereas the two mirror regions curved in the plane of the cyclic path provide convergence in a direction parallel to the plane of the cyclic path and substantially only in this direction.

The focal length and focal point of the input optic are different to those resulting from the combined effect of the mirror regions In alternative arrangements the input optic may control the extent of the interference pattern transversely to the plane of the cyclic path by expanding its extent.

In some arrangements it is desirable to control (by expanding of reducing) the extent of the interference pattern on the detector so as to optimally fit the interference pattern to the detector. In some arrangements the extent may be controlled to size the interference pattern (or a part of the interference pattern) to the whole array of sensors or pixels of the detector or may be controlled to size the interference pattern (or a part of the interference pattern) to a subset of the pixels or sensors of the detector. The pixels included in the extent desired are those that are read out and the pixels read out may be limited in this way.

The convergence provided by the input optic may result in the first and second beams being brought to a focus, or close to a focus, at the detector in their extent orthogonal or transverse to the plane of the cyclic path, and/or it may result in reducing their extent to better fit the detector or detector array dimension orthogonal or transverse to the cyclic path.

The convergence provided by the two mirror regions curved in the plane of the cyclic path may result in the first and second beams being brought to a focus around the cyclic path, for example, between the beamsplitter and detector, or between the second of the curved mirror regions and the beamsplitter. In the latter case, the second of the curved mirror regions traversed by the beam portions will be different for the two beam portions resulting in focus at different positions but at corresponding distances to the detector.

The input optic may have a focal length substantially corresponding to the optical path length from the input optic to the detector. Alternatively, and to better fit the extent to the size of the detector, the input optic may have a focal length slightly extended or reduced from the optical path length from the input optic to the detector by an amount to bring the interference pattern, in the direction transverse to the cyclic path, to a focus offset from the detector. The offset may be configured to bring the interference pattern to a focus in front of the detector by a small amount.

The input optic may be configured to focus, in the direction transverse to the cyclic path, the interference pattern to a focal plane offset and substantially parallel to the detector, or may be configured to focus to a focal plane coincident with the plane of the detector.

The mirror regions in combination may be arranged to generate, in the direction of the plane of the cyclic path, the interference pattern at the plane of the detector. This may be by focussing the beam portions, in the direction of the plane of the cyclic path, to a focus before reaching the detector but at a different position to the focus produced by the input optic.

The input optic may be a curved mirror or lens so as to provide the convergence to reduce the extent of the interference pattern orthogonally or transversely to the plane of the cyclic path at the detector surface.

The curved mirror or lens may be curved orthogonally or transversely to the plane of the cyclic path, and is preferably curved in this direction only. The curved mirror or lens may be curved about an axis parallel to, or more preferably, in the plane of cyclic path.

The input mirror may or lens be arranged to receive the input beam at a non-normal angle of incidence, such as an acute angle of incidence.

The input mirror may be arranged facing towards the detector, and depending on the arrangement of the Saganc loop the input optic may be parallel to the detector. The relative angular arrangement of the input mirror and detector, in the plane of the cyclic path, is so as to provide across the beam, in the direction of the plane of the cyclic path, substantially equal path lengths from the surface of the input optic to the surface of the detector. The input mirror may be a concave cylindrical mirror, and if facing the detector may have constant radius of curvature across length or axis. Similar considerations apply when the input optic is a lens. In such a case the lens may be a cylindrical mirror that is a mirror having a surface that is a section of a cylinder. For example, the lens may be a plano-convex lens. The lens may alternatively be toroidal or biconic as discussed below.

The input mirror may be arranged such that the line of focus provided by the input mirror is substantially parallel (but offset to), or substantially coincident with the plane of the detector surface.

The input mirror and detector may be arranged such that the angles of incidence of the beam at the input mirror and the centres of the beam portions at the detector are substantially the same, for example, may be the same to within 10° or 5°. The angles of incidence may be in the range 20 to 25°, but preferably around 22.5°.

The angular orientations of the input mirror and the detector may be symmetric about the line of division of the beam (the dividing surface of the beam splitter) into first and second beam portions.

The input mirror may be arranged such that the direction of the beam on arrival at the input mirror is opposite to that of the direction of the beam on arrival at the detector. For example, one may be directed left to right and the other may be directed right left, when considered with respect to the interferometer as a whole.

The input mirror may be a concave cylindrical mirror or lens and may have a varying focal length along its axis. This may take account of variation in path length caused by the different distances across the beam, in the direction of the plane of the cyclic path, from the surface of the input optic around the two curved mirror regions to the surface of the detector. The focal length of the input optic may vary linearly along its axis.

The concave cylindrical mirror or lens may be arranged to receive the input beam at a non-normal or normal angle of incidence. For the mirror a non-normal angle is preferable such that the field fronts of the beam arrive at the input mirror surface with first portions of the field front arriving before second portions, and the variation in focal length of the cylindrical mirror is such that a region of the cylindrical mirror receiving the first portions of the field front first is of a greater radius of curvature than a region of the mirror receiving the second portions of the field front. For the lens case, the lens is arranged to receive the input beam at normal angle of incidence. The lens may have a variation in focal length across the lens, in the plane of the cyclic path. The variation may be such that the regions of the lens which have a shorter path length to the detector have a shorter focal length than regions of the lens which have a longer path length to the detector.

The input optic may be arranged to focus the beam extent orthogonally or transversely to the plane of the cyclic path such that the extent of the interference pattern at the detector surface in a direction orthogonal or transverse to the plane of the cyclic path corresponds to the detector extent in said orthogonal or transverse direction.

As mentioned above, the input optic may have a focal length corresponding to the optical path length from the input optic to the detector. This may take the form of an average path length taken across the width of the beam or across beam portions, or the focal length may vary across the input optic.

The interferometer may further comprise a beamsplitter arranged to divide the input beam and recombine the first and second beam portions to form the interference pattern at the detector surface.

The at least two mirror regions curved in the plane of the cyclic path may be curved to provide convergence, or reduce the extent, of the first and second beam portions within the plane of the cyclic path.

The at least two mirror regions curved in the plane of the cyclic path may be curved to bring the first and second beam portions to a focus before reaching the detector surface.

The at least two mirror regions curved in the plane of the cyclic path may be curved to bring the first and second beam portions to a focus after each of the beam portions has been reflected from the at least two mirror regions. In alternative arrangements the at least two mirror regions may provide focusing to the first and second beam portions but the focusing may result in a focus at the detector or a virtual focus behind or beyond the detector.

The path difference across the detector surface may vary monotonically, that is, monotonically increasing or monotonically decreasing across the detector surface. In some arrangements the path difference may vary linearly across the detector surface.

The detector may comprise a two-dimensional pixel array.

The interferometer may further comprise readout circuitry to readout pixel data from the pixel array, the readout circuitry configured to readout only a selected subset of the pixels in the array.

In an alternative arrangement the two mirror regions may be flat. In such a case the convergence of the beams in the plane of the cyclic path may be provided by the input optic or input optics. In such a case the input optic or input optics would be required to provide convergence in the plane of the cyclic path (as provided by the curved mirror regions in the above) and convergence transversely to the plane of the cyclic path (as provided by the input optic in the above). The two convergence requirements will likely be different resulting in a mirror having a different curvature in the plane of the cyclic path to that transverse to the plane of the cyclic path. The mirror may be a toroidal mirror, that is, it has a curved surface which takes the form of a section of a torus. Similarly, if the input optic is a lens it may have a toroidal surface. A lens of this kind having two different curves on one surface is often known as biconic. In one example embodiment, the two mirror regions may be curved to provide limited focussing in the in the plane of the cyclic path, and the input mirror may be curved differently in the plane of the cyclic path to that transverse to the plane of the cyclic path such that the input mirror also provides limited focussing in the plane of the cyclic path, as well as focussing in the direction transverse to the cyclic path.

The present invention provides a spectrometer comprising the interferometer set out above, and further comprising an analyser arranged to provide an indication of wavelengths present in the input beam based on a Fourier transform of the interference pattern.

The present invention also provides a method of operating a common path interferometer, the method comprising:

directing an input beam at an input optic to provide convergence;

dividing the input beam into first and second beam portions and directing the beam portions in opposite directions around a cyclic path, the first and second beam portions traversing the cyclic path by reflection at at least two mirror regions curved in the plane of the cyclic path, and forming an interference pattern at a detector surface, the interference pattern representing path difference variations between the first and second beam portions across the detector surface in the plane of the cyclic path, wherein the input optic is provided before division of the input beam into the first and second beam portions, the convergence provided by the input optic is to control the extent transversely to the plane of the cyclic path of the interference pattern at the detector surface.

The present invention further provides a method of manufacturing a common path interferometer, the method comprising:

arranging an input optic to receive an input beam;

arranging a beam division optic to divide the input beam received by the input optic into first and second beam portions and to direct the first and second beam portions;

arranging at least two mirror regions to form a cyclic path such as to direct the first and second beam portions in opposite directions around the cyclic path;

arranging a detector to detect an interference pattern between the first and second portions at the detector surface, the cyclic path being arranged such that the interference pattern represents path difference variations between the first and second beam portions across the detector surface in the plane of the cyclic path, wherein the input optic is configured to provide convergence to control the extent transversely to the plane of the cyclic path of the interference pattern at the detector surface.

BRIEF DESCRIPTION OF THE DRAWINGS

Embodiments of the present invention and aspects of the prior art will now be described with reference to the accompanying drawings, of which.

DETAILED DESCRIPTION

Figure 1:
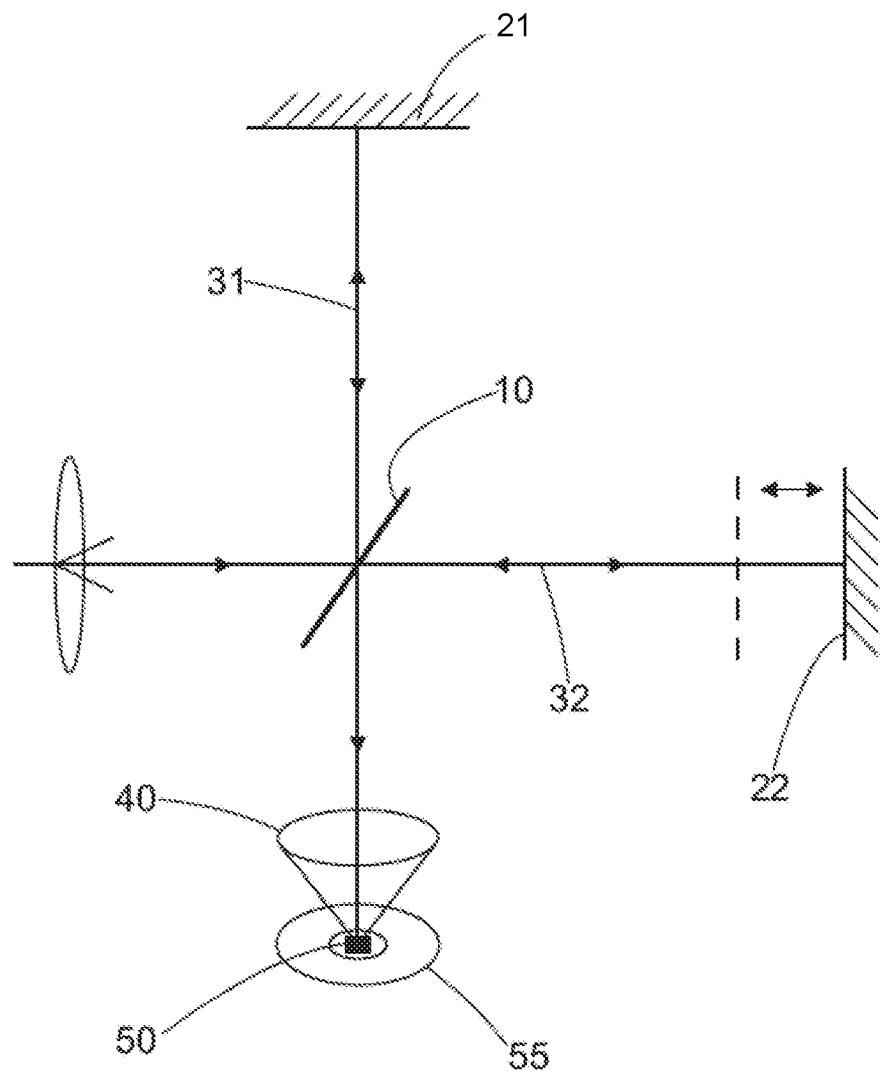
FIG. 1 is a schematic diagram showing a conventional Michelson (double path) interferometer.
Figure 2:
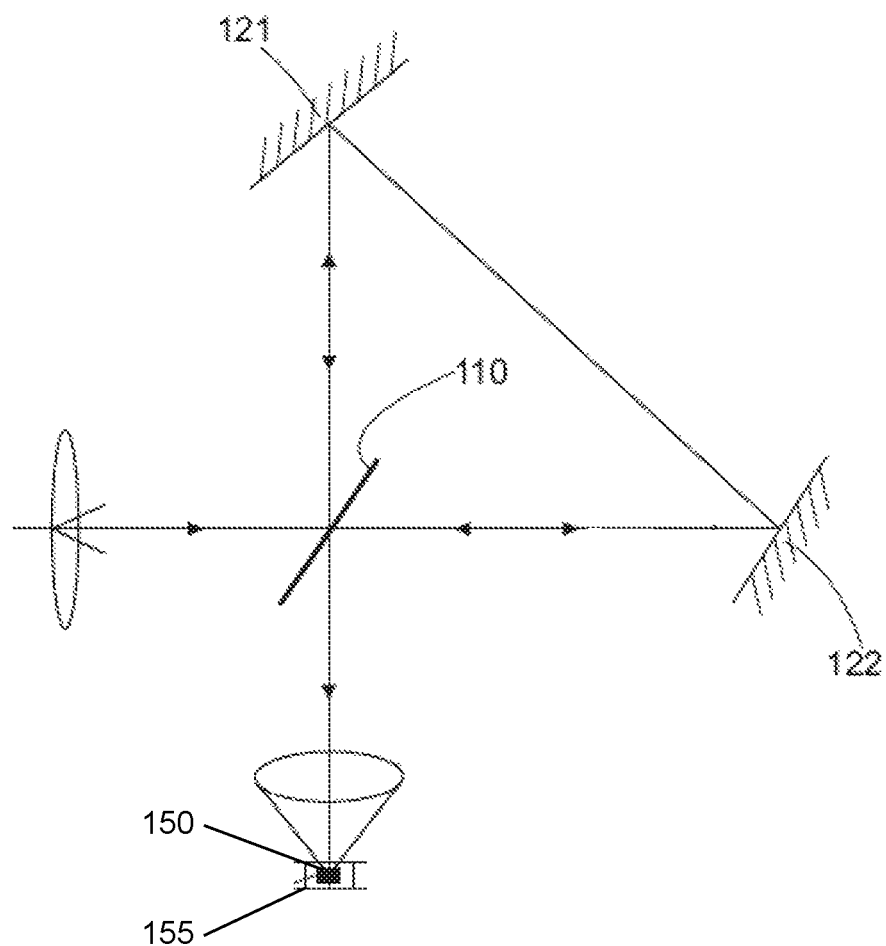
FIG. 2 is a schematic diagram showing a conventional Sagnac (common path) interferometer.
Figure 3:
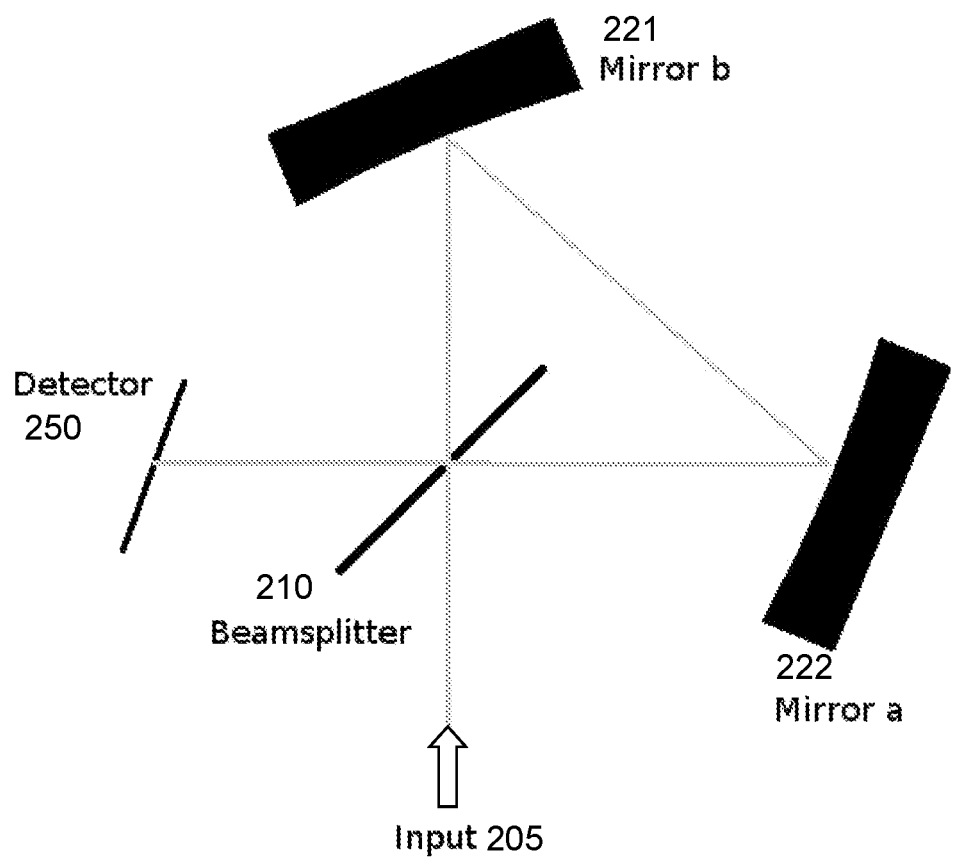
FIG. 3 is a schematic diagram of a modified Sagnac interferometer including curvature in the mirror regions to converge beam portions controlling their extent in the plane of the cyclic path.

FIG. 3 shows an interferometer according to a Sagnac geometry. The interferometer comprises a detector 250 and optics for dividing a beam and guiding the resulting beam portions in opposing directions around a cyclic path.

The optics include a beamsplitter or other beam division optics 210, and two reflecting elements such as mirrors or mirror regions 221, 222. The beamsplitter 210 may be a partially reflecting mirror, a beamsplitter cube, a plate beamsplitter, etc. In one embodiment the beamsplitter may be a wedge beamsplitter having a partially reflecting surface. The mirror regions 221, 222 may be curved having the same curvature as each other or may have different curvatures. The curvature is so as to provide a concave mirror. The detector 250 is preferably a sensor with a pixel array.

If a beamsplitter is used it is preferably arranged at 45° to the angle of incidence of an input beam of light or radiation 205. The input beam is divided into two beam portions by the light divider or beamsplitter 210. For beamsplitters of the types mentioned above, the beamsplitter provides a reflected beam and a transmitted beam. Other beam division optics may provide two beam portions in other ways. With some types of beamsplitter, adjusting the angle of incidence of the input beam 205 at the beamsplitter may be used to adjust the ratio of amplitudes of the transmitted and reflected beams. Preferably, the beamsplitter or other beam division optics is designed to provide a 50:50 amplitude split between the two beam portions produced. The two mirrors 221, 222 may be positioned at approximately equal distances and angles from the beamsplitter or other beam division optics. The first mirror 221 is positioned at the front side of the beamsplitter on the same side as the input beam 205, and is arranged to receive the reflected beam portion. The second mirror 222 is positioned at the rear side of the beamsplitter 210 on the opposite side to the input beam 205, and arranged to receive the transmitted beam portion.

At the first mirror or mirror region 221, the beam portion reflected from the beamsplitter, is again reflected such that it is directed towards second mirror 222. The beam portion is then reflected again at second mirror 222 and is directed towards beamsplitter 210. At this second time of reaching the beamsplitter, the beam portion is reflected towards the detector 250.

At the second mirror 222, the other beam portion, namely that transmitted through the beamsplitter is reflected such that it is directed towards first mirror 221. This beam portion is reflected again at first mirror 221 and is directed towards beamsplitter 210. At the beamsplitter, the beam portion is transmitted through the beamsplitter towards the detector 250.

The two beam portions travel around almost the same paths but in opposite directions. Referring to FIG. 3, one beam portion travels from the beamsplitter to mirror a to mirror b to the beamsplitter and on to the detector (i.e. BS-Ma-Mb-BS-D). The other beam portion travels from the beamsplitter to mirror b to mirror a to the beamsplitter and on to the detector (i.e. BS-Ma-Mb-BS-D). The two beam portions do not travel precisely the same path because of the need for there to be a phase difference or path length difference when the beam portions arrive at the detector. Furthermore, the beam portion that arises from the part of the input beam that is transmitted through the beamsplitter will cross its own path as the beam portion travels from mirror a to the beamsplitter and on towards the detector. Conversely, the beam portion that is produced by reflection of a portion of the input beam at the beamsplitter may not form a completely closed loop since the two points of reflection at the beamsplitter may not be exactly identical.

As mentioned above the division of the input beam into two beam portions may not be by a beamsplitter but may instead be by other beam division means such as a fibre optic beam splitter. The mirrors 221 and 222 may be separate mirrors or may be regions of the same mirror. If the mirrors 221 and 222 are formed as regions of the same mirror it is likely the radius of curvature will need to vary in between the regions to allow the same mirror surface to be of compact dimensions.

The curvature of the mirrors or mirror regions 221 and 222 provides convergence to the beam portions as they travel from the mirrors towards the detector.

Turning now to the two paths of the beam portions, as the beam portions leave the beamsplitter for the second time, having travelled via mirrors 221 and 222, the beam portions are slightly displaced with respect to each other. The path difference results from the positions of the mirrors and beamsplitter not being fully symmetrical about the beamsplitter. Furthermore, the beamsplitter translates the beams due to the thickness of the beamsplitter.

The slightly different paths around the optical system introduce shear between the two beam portions. Interference results from a difference in relative phases between the two beam portions when they combine at the detector.

The mirrors 221 and 222 are concavely curved in the plane of the cyclic path. In other words, the curvature is about an axis normal to the plane of the cyclic path. Preferably, the mirrors are not curved transversely to the plane of the cyclic path. The curvature of mirrors 221 and 222 is so as to converge the beam portions to produce an interference pattern at the detector. The convergence may result in the beam portions coming to a focus at the detector surface. However, as we shall see later this is not necessarily required and the mirrors 221 and 222 may bring the beam portions to a focus before the reaching the detector or even provide only limited convergence to a virtual focus behind the detector. As mentioned above, the beamsplitter translates the beam portions so the beamsplitter also translates the horizontal focal plane (focussing in plane of cyclic path) by an amount determined by the thickness of the beamsplitter.

The curvature of mirrors 221 and 222 has been discussed above and it is apparent that because these mirrors only have curvature in one direction, namely, the plane of the cyclic path, they only provide convergence to the beam portions in their extent in the plane of the cyclic path. The extent of the beam portions orthogonally to the plane of the cyclic path has not been discussed.

Figure 4A:
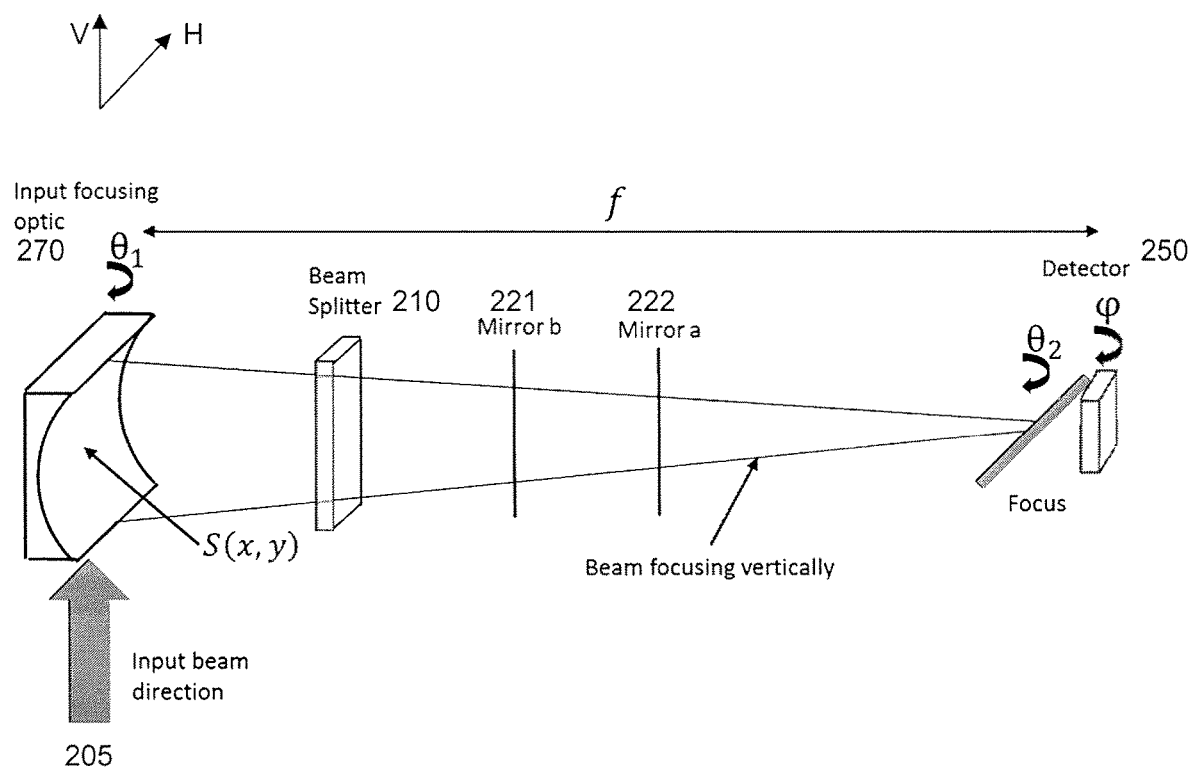
FIG. 4a is a linear schematic representation of the interferometer of FIG. 3 with an additional input focussing optic, wherein the input focussing optic is a mirror.
Figure 4B:
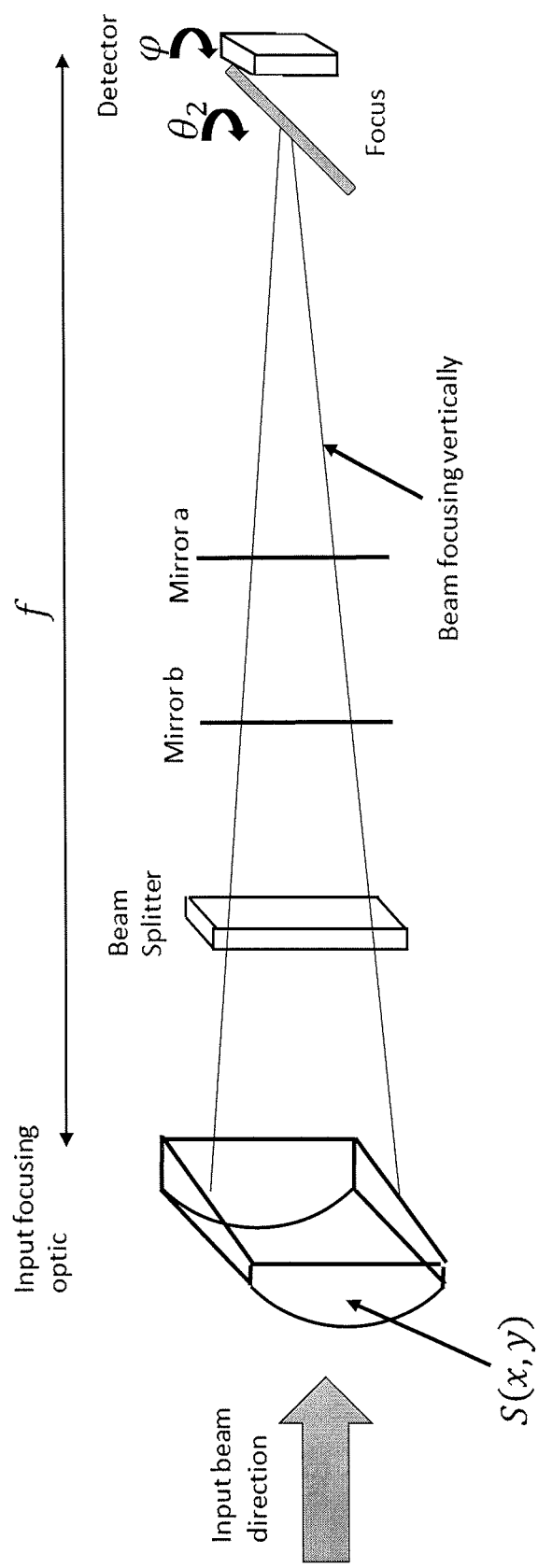
FIG. 4b is a linear schematic representation of the interferometer of FIG. 3 with an additional input focussing optic, wherein the input focussing optic is a lens.

The present invention is directed to controlling the extent of the beam portions orthogonally to the plane of the cyclic path. FIGS. 4a and 4b are schematic illustrations of the focussing of the beam or beam portions orthogonally to the plane of the cyclic path by the use of an input focussing optic 270. For simplicity these figures depict only the beam portion transmitted through the beam splitter. Furthermore, the interferometer optics are shown arranged in a linear sequence to reduce, for illustration and understanding, focussing of the beam in three-dimensions to the more conceptually straight forward two-dimensions, although this is not actually the case. FIG. 4a shows the input focussing optic as a mirror, whereas FIG. 4b shows the input focussing optic as a lens.

The input focusing optic 270 provides focusing only in the direction orthogonal to the cyclic path. In FIGS. 4a and 4b, this out-of-plane focussing is the vertical direction and there is no focusing shown in the horizontal direction (orthogonal to the plane of the paper). In the actual interferometer the focussing in the horizontal plane is provided by mirrors 221 and 222.

The purpose of the input focusing optic is to optimally fill the detector with radiation in the vertical direction (orthogonal to the plane of the cyclic path), thus increasing the interferometer signal-to-noise (SNR) and sensitivity for a given acquisition time. This may also lead to faster acquisition times permitting observation of more rapid processes occurring in the spectrum of the input beam. For example, in the case of a two-dimensional detector which has a fixed per-pixel read back time it may be desirable to read back only a portion of the pixels of the two-dimensional detector array. Commercially available detectors have a limited spatial extent and array size so it is desirable to shape the beam or interference pattern to fit the detector. To put it another way it is desirable to minimise power loss such as by minimizing optical power that misses the detector, for example through excessive beam extent. It may also be desirable to maximise the number of detector elements that are illuminated. An alternative approach would have been to redesign the detector to fit the extent of the interference pattern. However, such a redesign would be prohibitively costly.

The arrangement in FIG. 4a shows the input focussing optic as a cylindrical mirror. A mirror is the preferred choice for the optic, but a lens may instead be used as shown in FIG. 4b. Since the focussing provided by the input optic is required in only one direction, a conventional circularly symmetric lens would not have the desired effect. Instead, a lens with a line of symmetry such as a cylindrical lens or rod lens would be required. Although a cylindrical mirror is one preferred choice, as will be discussed later a cylindrical lenses or cylindrical lenses of varying curvature may provide better performance.

FIG. 4a shows the input optic as a cylindrical focussing mirror. Preferably the input beam is collimated or near-collimated and its spatial extent is approximately matching that of the focussing optic such that optimal use is made of the focussing power of the mirror. As illustrated in the figure to optimally focus the beam extent in the direction orthogonal to the plane of the cyclic path (vertical direction in figure) the focal length f of the lens may be chosen to match the separation of the centre of the focussing optic and the centre of the detector along the beam propagation direction through the interferometer. In FIG. 4a the detector is shown translated back slightly from the optimal location for the vertical focus, however this is for illustration in the figure only. In practice the detector position is at the focus, although in some embodiments it is preferable to have a focal length shorter than the input optic to detector path length. This allows the extent to be expanded to fill the detector. In such a case the focus may be just in front of the detector by, for example, around 1 cm.

The optical system should be designed and configured to optimise the quality of the interferogram at the plane of the detector surface. If the case of a single wavelength input beam is considered the interferogram should have a uniform spatial period (an unchirped interferogram). The plane of the phase fronts of the two beam portions arriving at the detector should be parallel to the surface of the detector. The angular configuration of the mirrors and beam splitters requires careful selection to provide the best performance.

Figure 5:
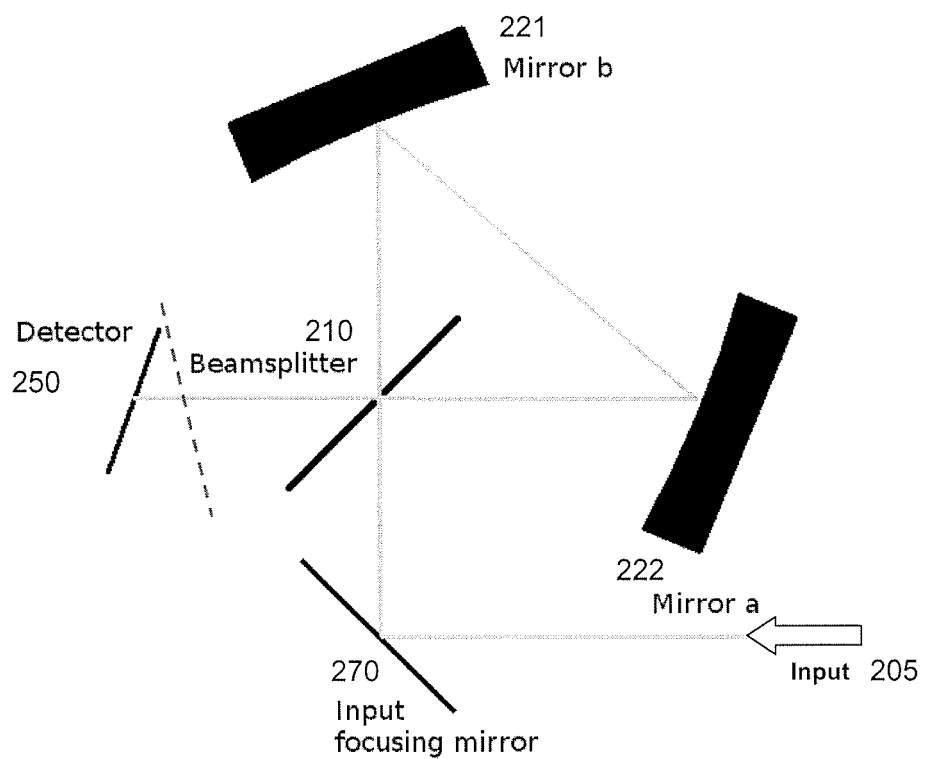
FIG. 5 is diagram showing the interferometer of FIG. 4a with the input focussing optic in a first orientation.
Figure 6:
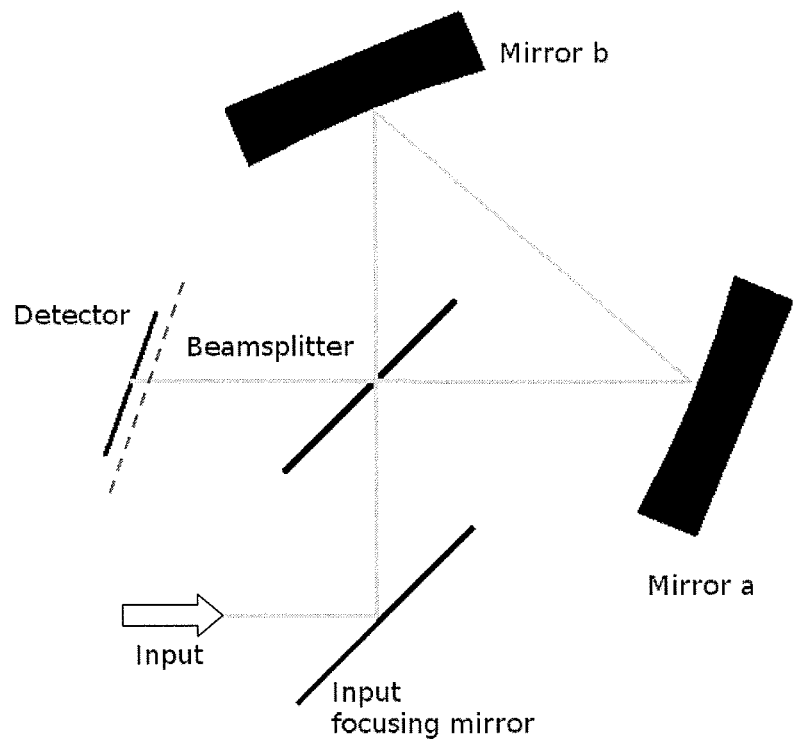
FIG. 6 is diagram showing the interferometer of FIG. 4a with the input focussing optic in a second orientation.

The system of FIG. 3 uses curved mirrors 221 and 222 off-axis. The same curved mirrors are shown in FIGS. 5 and 6 along with the input focussing mirror 270. FIGS. 5 and 6 show two example configurations of the input focussing mirror 270.

In FIGS. 3, 5 and 6 the detector is shown with an angular offset to the normal directions of the beam portions. This angular offset arises to maximise the uniformity of the fringe period at the detector, or in other words to minimise chirp at the detector. The angular offset is denoted by $\varphi$ in FIG. 4a. The angular offset is to compensate for tilt introduced to the phase fronts of the beam portions by non-normal incidence of the beam portions at the curved mirrors 221 and 222. In more detail if we consider a beam portion arriving at mirror 221 the beam portion will have some width such that one side of the beam portion will arrive at the mirror 221 before the other side of the beam portion. The same is true at the other curved mirror 222. The result is that between the two mirrors 221 and 222 one side of the beam portion will travel a greater distance than the other side of the beam portion. The part of the beam furthest away from the beamsplitter will travel a shorter path than the part of the beam closest to the beamsplitter resulting in the phase fronts at the detector being non-normal to the directions of propagation of the beam portions. Hence, for the phase fronts to be parallel to the detector surface the detector should be tilted in the plane of the cyclic path.

FIGS. 5 and 6 show two example configurations of input focussing optic 270. Both focus the extent of the input beam down in a direction orthogonal to the plane of the cyclic path. The configurations can be considered to have input beam directions having different handedness. For example, one may be right handed and the other left handed. In FIG. 5 the input focussing mirror 270 is oriented away from the detector whereas in FIG. 6 the input focussing mirror is oriented towards the detector. The orientation of the input focussing mirror determines the orientation of the phase fronts as they reach the detector 250. FIGS. 5 and 6 have dashed lines showing the orientation of the phase fronts as they reach the detector surface. These lines represent the phase fronts in considering the focus of the beam portions orthogonal to the plane of the cyclic path. In FIG. 5 the plane of the phase fronts does not match the plane of the detector surface. In FIG. 6 the plane of the phase fronts matches the plane of the detector surface schematically indicating that with the input focussing mirror facing towards the detector the arrangement is better optimised.

To consider this further we return to FIG. 4a. Here the focussing optic is oriented at an angle $\theta_1$ to the beam propagation axis through the interferometer. The angle of incidence of the input beam can be adjusted if the angle $\theta_1$ is adjusted. For a cylindrical mirror having focal length f the angle of the focussing optic results in the vertical focal plane at the detector being tilted by an angle $\theta_2$ with respect to the beam propagation axis. For a cylindrical mirror of constant radius then $\theta_2=\theta_1$. The tilting of the focal plane can be understood if one considers that tilting the input focusing mirror moves one of its edges closer to the detector than the other. If the orientation of the input focussing mirror is set such that $\theta_2=45°$ and the detector is set such that $\varphi=0$, the detector will see an optimal focus at the centre but the horizontal edges with one edge focussed before the detector and the other edge focussed after the detector. In practice, for the reasons set out above the $|\varphi|>0$. To optimally fill the whole width of the detector in the direction orthogonal to the cyclic path (the vertical extent in FIG. 4a), the input beam orientation and input focussing mirror orientation may be adjusted such that $\theta_1=\theta_2=\varphi$ such that the tilt of the out of plane focus matches the tilt of the detector. To change the sign of the angle $\theta_2$ the input beam and input mirror may be swapped to face the opposing direction as shown in FIG. 6.

An alternative to adjusting the input beam orientation to match the detector tilt with the focus in the direction orthogonal to plane of the cyclic path is to use a more complex optic than a cylindrical mirror. For example, the surface profile S(x, y) may be used to provide a varying radius of curvature across the width of the cylindrical mirror. In other words the radius of curvature might be considered to vary as you move along the axis about which the cylinder is curved. This results in the focal length of the input focussing optic varying across its width x (or horizontal direction shown in FIG. 4a). In this arrangement angle $\theta_1$ may not equal angle $\theta_2$. To make $\theta_2$ equal to $\varphi$ the focal length at each point along the input optics width x should be chosen to match the distance to the corresponding location on the detector surface.

Of course, there may be circumstances when it is advantageous to use both the technique of adjusting the input beam orientation to match the detector tilt and a more complex optic than a cylindrical mirror.

Simulations have been performed to determine the orientation of the input mirror to achieve optimum performance with regard to phase front alignment at the detector surface. Simulations have also been performed to design a non-cylindrical mirror to optimise performance.

As mentioned above and shown in FIG. 4b, the input focussing optic may be a lens. Similar consideration apply to a lens as those discussed above relating to a mirror. As well as these considerations, for a lens it is preferable not to have the angle of incidence at the lens rotated significantly away from a normal angle of incidence, because of distortion by the lens in such a configuration. In FIG. 4b the angle of incidence is normal to the lens.

To match the alignment of the phase fronts to the detector surface, again we look to provide equal path lengths from the lens, around the interferometer, to the detector, across the width of the beam in the plane of the cyclic path. To do so this is mostly achieved by a varying focal length across the lens width, as shown in FIG. 4b. There are a number of approaches for varying the focal length across the width of the lens, which may include varying the surface curvatures or lens thickness. We may choose to use a combination of optical components to achieve this. FIG. 4b shows front and back surface of the lens may be described a function S(x,y) such that the condition $\theta2=\varphi$ is met. In other words the angle of the focal plane at the detector matches that of the detector surface. In FIG. 4b this condition is shown as satisfied, at least partially, by having a varying thickness across the lens width.

Vertical Focus and Horizontal Focus

Figure 7:
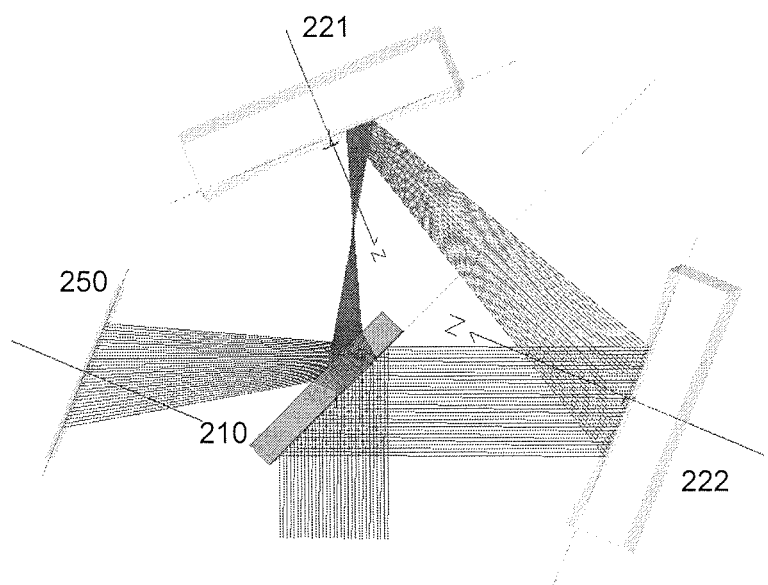
FIG. 7 is a ray diagram showing modelling of paths lengths to the detector plane for the interferometer of FIG. 3.

As discussed above, the convergence and focussing of the beam and beam portions is controlled differently in the out-of-plane and in-plane directions of the cyclic path. The mirror regions control the convergence of the beam portions in the plane of the cyclic path and bring the beam portions to a focus before the detector. For example, the mirror regions bring the beam portions to a focus before the beamsplitter but after leaving the second mirror region, such as shown in FIG. 7. The beam portion propagating anti-clockwise around the cyclic path is brought to a focus between mirror region 221 and beamsplitter 210. The beam portion propagating clockwise around the cyclic path is brought to a focus between the mirror region 222 and beamsplitter 210. As mentioned, the mirror regions 221 and 222 provide convergence to the beam portions in the plane of the cyclic path. Hence, the foci of the beam portions resulting from the combined actions of the mirror regions may be considered to be horizontal foci.

The interference pattern produced at the detector is a result of the divergence or spreading of the beam portions as they propagate after the horizontal foci. The mirror regions and detector are arranged such that the beam portions overlap each other at the detector surface. The central parts or rays of the two beam portions will not propagate on coincident paths as a result of travelling different paths around the cyclic path. Hence, there will be a point where these central parts or rays cross. Preferably, the detector is placed such that its surface is at this crossing point. This crossing point is where the beam portions produce the best interference pattern due to coherence of the beam portions. Preferably, the detector surface is located at or close to this position, such as within 1 mm of the crossing point, or more preferably within 10s of microns of the crossing point.

The input optic provides convergence to the beam and beam portions in a direction out of the plane of the cyclic path. That is, the input optic determines the vertical focus of the beam and beam portions.

Thus, on the one hand the detector position is set by the location of the mirror regions to provide the interference pattern, and on the other hand the input optic sets the out-of-plane beam extent at the detector.

Phase Front Analysis

In the systems shown in FIGS. 4a, 5 and 6 a constant radius of curvature cylindrical mirror is used to provide focussing or convergence of the beam or beam portions to limit their extent in a direction orthogonal to the plane of the cyclic path. We have also discussed above that other optics may be used instead of a cylindrical mirror, but we take the example of a cylindrical mirror to analyse path differences around the interferometer.

The focus from a cylindrical mirror arranged as shown in FIG. 4a is simply linear when illuminated with collimated light at 0° angle of incidence. However, if the angle of incidence is 45° the focus will also be tilted by 45° as it will stay parallel to the axis of the cylindrical mirror. This will be because the distance to the focus from the mirror surface must be the same across the width of the beam.

In the arrangements shown in FIGS. 4a, 5 and 6 the mirror regions 221 and 222 make the assessment of path length from the input focussing mirror to the detector more complicated, not simply because of the off-axis reflections but also because of the curvature of the mirror regions 221 and 222. These effects introduce different path lengths across the beam as we move around the cyclic path. Hence, to determine the position (and/or ideal shape) of the input focussing mirror we need to determine the shape of the focus in the direction orthogonal to the plane of the cyclic path after the beam has travelled around the cyclic path.

An analysis has been performed by computing the different path lengths for rays or parts of the beam spread across the plane of the cyclic path (that is, spread across the horizontal axis H shown in FIG. 4a). Considering first rays or parts of the beam reflected from the beamsplitter surface, we consider an example of a source 12 mm across and with 31 rays equally spaced across the width of the beam. This is shown in FIG. 7. The detector plane is oriented at 22.5° to the normal d the beam to minimize chirp. As shown in FIG. 5 the rays all begin at the source plane with no tilt with respect to the input direction. The rays are first reflected by the beamsplitter 210 then reflected by mirror 222. At mirror 222 they are incident at around 22.5° and the mirror 222 has curvature so provides convergence to the rays. The rays then travel to the mirror 221 where they are again incident at around 22.5°, and the mirror 221 has curvature providing further convergence to the rays. In the arrangement modelled in FIG. 7 the rays come to a focus after mirror 221 but before returning to the beamsplitter. The rays hit the beamsplitter at around 45° and head towards the detector. The rays may now be diverging. The rays reach the detector surface which, as mentioned above, is tilted. The path length is calculated for each ray to allow the shape of the focus to be calculated at the detector. The calculation is repeated for different angles of incidence (AOI) on the input focussing mirror.

Figure 8:
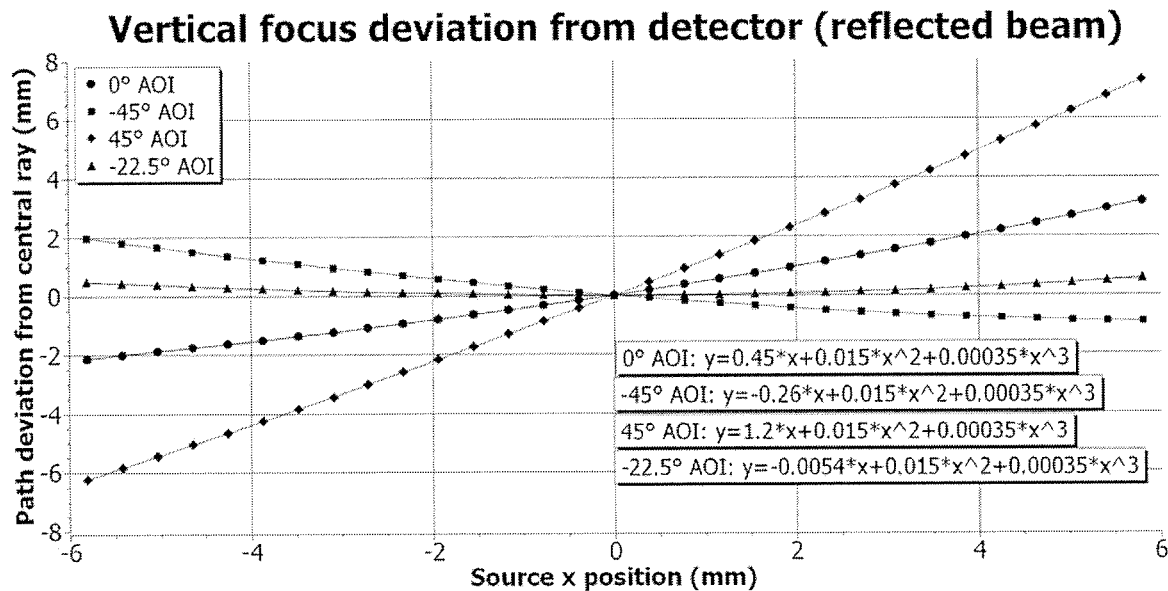
FIG. 8 is a graph showing path length deviations across the beam in comparison to a central ray for the focus in a direction orthogonal to the plane of the cyclic path for the reflected beam portion.

FIG. 8 shows a graph of the deviation of the out of plane (vertical V) focus at the tilted detector surface. FIG. 8 shows four different angles of incidence on the input focussing mirror, namely 0°, −45°, 45° and −22.5° Negative angles correspond to the input focussing mirror facing the detector such as in FIG. 6. The abscissa represents the distance across the input beam, as provided by the various rays. The ordinate of the graph shows the path deviation at the detector compared to the central or chief ray. The graph of FIG. 8 shows that at an angle of incidence (AOI) of −22.5° the minimal deviation is achieved, with less than 1 mm deviation across the entire width of the beam. For a cylindrical mirror having a focal length f=150 mm this would be at most a ~0.3% error in the focal plane. It is noted that the optimum 22.5° is the same tilt as that at the detector. In general it is considered that this will not be the case and the equal values arise simply from coincidence and the example values used here, Indeed it is expected that the values will not be equal since the action of the two Sagnac mirrors will likely be quite different in the vertical and horizontal. Nevertheless, the desired arrangement of the input mirror is such that the line of focus provided by the input mirror is substantially parallel or substantially coincident with the plane of the detector surface. In some embodiments this may be achieved when the input mirror and detector are arranged such that the angles of incidence at the input mirror and at the detector are substantially the same. For example, this may be when the angles of incidence are in the range 20 to 25°. In some embodiments it may be preferable to have the angular orientations of the input mirror and the detector symmetric about the line of division of the beam into first and second beam portions. As mentioned above, it is preferable that the input mirror is arranged such that the direction of travel of the beam on arrival at the input mirror is opposite to that of the direction of travel of the beam on arrival at the detector, such as shown in FIG. 6.

Figure 9:
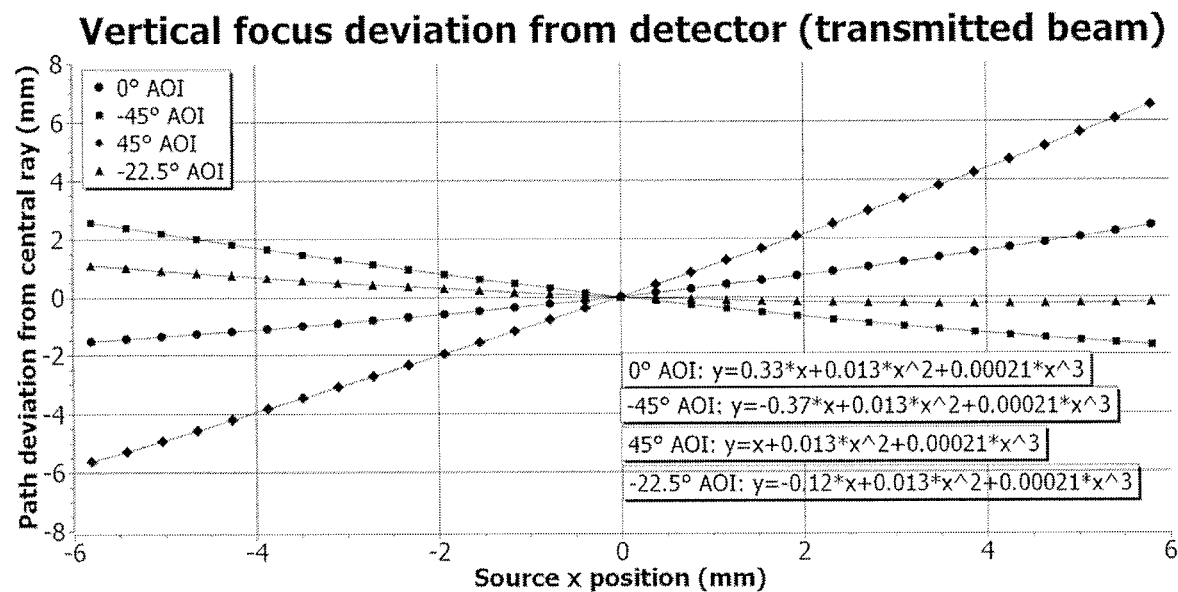
FIG. 9 is a graph showing path length deviations across the beam in comparison to a central ray for the focus in a direction orthogonal to the plane of the cyclic path for the transmitted beam portion.

FIG. 9 shows the corresponding graph for the beam portion that is transmitted through the beamsplitter and travels first to mirror 221 then to mirror 22, back to the beamsplitter and on to the detector. Again the same four angles of incidence are assessed. The optimal angle of incidence that has minimum path length deviation at the detector is again at 22.5° angle of incidence, although instead of being symmetric across the beam there is some tilt showing a greater deviation for rays from the source in the negative (x) direction compared to the positive (x) direction.

In FIGS. 8 and 9 there is a small amount of curvature in the plotted deviations. This results from the curvature of the mirror regions 221 and 222 and their focussing effect in the plane of the cylindrical path. To remove this curvature the radius of curvature of the cylindrical input focussing mirror would need to be correspondingly varied to change the focal length by, for example, up to around 1 mm. The slightly different deviations of the reflected and transmitted beam portions would likely mean a compromise in focal length between the two may be needed. As shown in FIG. 8 the curves can be considered to take a polynomial form and this could be used to design the mirror, for example, to set the variation in focal length across the mirror. The curves may also take other forms and may be used for the setting the variation in focal length across the input optic. Such curves may also be used for setting the variation on focal length where a lens is used for the input optic instead of a mirror. The aim is to reduce the path difference to zero across the x-axis. Tilting the input optic adjusts the first parameter in the polynomial, so tilt could be used to reduce the first parameter to zero. Having a varying focal length across the input optic can be used to minimize the other two coefficients, but a linearly changing focal length will only affect the first coefficient.

The above describes two options for aligning, in the plane of the cyclic path, the field fronts to the plane of the detector. These are: i) to adjust the orientation of the input optic and input beam, and ii) have a variation in the focal length of the input optic along its axis. These can be used separately or in combination. However, there may be an even greater advantage of using both approaches together in some arrangements. The simpler of the two approaches is to rotate the orientation of the input optic. However if this approach requires a small angle then it may be physically challenging to arrange the focusing optic in such a way as to achieve this, for example the input beam may be obstructed by one of the Sagnac mirrors or the detector. If this were to happen then the only way of achieving such an input angle would be to move the input focusing optic further away from the Sagnac loop. However, this in turn means that a weaker longer focal length optic would be required but this would degrade the performance of the focusing optic. To avoid this problem it is preferable to tilt the input optic as much as possible before without any obstruction to the input beam and then to use a variation in the optic focal length to account for the remainder of the adjustment in the focus required to match the fronts at the detector.

Varying Focal Length Optic

To create an example varying focal length cylindrical mirror, one end of the mirror may have a maximum radius of curvature, whereas the other end may have a minimum radius of curvature. The surface in between may change monotonically between the two extremes, such as linearly. In one example, one edge has a radius of curvature of 252.45 mm whereas the other edge has a radius of curvature of 237.55 mm, with a mirror width of 36 mm. This example would be used at an angle of incidence of −45°, although other angles of incidence such as −30° or −35° may also be used for an appropriately designed mirror. Here the variation in radius of curvature is used to compensate for the different path lengths. Again, as for the tilted optic a variation may be included to remove the variation in path length due to the curved mirrors 221 and 222. This would result in an input optic having two aspects to the variation in the radius of curvature: the first would be a linear variation to take account of the tilt angle on the input focussing mirror, and the second would reduce the curvature of the deviation shown in FIGS. 8 and 9.

Although we have described the input optic as having a cylindrical form, optionally with varying radius of curvature along its length, the optic may also be a cylindrical, that is taking the form of a shape that differs from a cylinder in order to include additional refinements. This would allow a custom mirror to optimally condition the input beam and minimize the path difference across the beam. Such an a cylindrical mirror may be considered analogous to an aspheric lens.

The detector may comprise a pixel array such as two-dimensional pixel array. The pixel array may be read out by readout circuitry. The readout circuitry may be configured to read out the pixel data of every pixel at the end of each light or radiation collection phase. Alternatively, to increase the speed of read out the readout circuitry may be configured to readout only a selected subset of the pixels in the array in some or each readout phase following a collection phase.

The interferometer may form part of a spectrometer. The spectrometer may further comprise an analyser arranged to calculate and output an indication of wavelengths present in the input beam based on a Fourier transform of the interference pattern.

The person skilled in the art will appreciate that various further modifications and alterations may be made to the above described apparatus without departing from the scope of the appended claims. For example, the interferometer has been described with certain angles of incidence or focal lengths, but is not to be limited to these dimensions.

The invention claimed is:

1. A common path interferometer configured to divide an input beam into first and second beam portions and direct the first and second beam portions in counter-propagating directions around a cyclic path to form an interference pattern between the first and second portions at a detector surface, the common path interferometer comprising:
   a beam splitter configured to divide the input beam into the first and second beam portions;
   a detector having a detector surface;
   at least two mirror regions curved in a plane of the cyclic path, the cyclic path being defined by the at least two mirror regions and the beam splitter such that the interference pattern represents path difference variations between the first and second beam portions across the detector surface in the plane of the cyclic path; and
   an input optic for receiving the input beam and directing the input beam to the beam splitter for division into the first and second beam portions, the input optic configured to provide convergence to modify the extent, relative to the input beam and transversely to the plane of the cyclic path, of the interference pattern at the detector surface,
   wherein the input optic is configured to provide convergence substantially only in a direction transverse to the plane of the cyclic path, whereas the two mirror regions curved in the plane of the cyclic path provide convergence substantially only in a direction parallel to the plane of the cyclic path.

2. The common path interferometer of claim 1, wherein the input optic is arranged to provide across the beam, in a direction transverse to the plane of the cyclic path, substantially equal path lengths to the detector.

3. The common path interferometer of claim 1, wherein the mirror regions and input optic are arranged to separately provide different convergence in the directions in the plane of the cyclic path and transverse to the plane of the cyclic path, respectively.

4. The common path interferometer of claim 1, wherein the input optic has a varying focal length along its axis.

5. The common path interferometer of claim 4, wherein the focal length of the input optic varies linearly.

6. The common path interferometer of claim 1, wherein the input optic has a constant focal length across a its width direction, the width direction being in the plane of the cyclic path.

7. The common path interferometer of claim 1, wherein the input optic is arranged to focus the beam extent orthogonally to the plane of the cyclic path such that the extent of the interference pattern at the detector surface in a direction orthogonally to the plane of the cyclic path substantially corresponds to the detector extent in said orthogonal direction.

8. The common path interferometer of claim 1, wherein the input optic is arranged to receive the input beam at a non-normal angle of incidence.

9. The common path interferometer of claim 1, wherein the input optic has a focal length substantially corresponding to the optical path length from the input optic to the detector to bring the interference pattern to a focus coincident with the detector.

10. The common path interferometer of claim 1, wherein the input optic has a focal length offset from the optical path length from the input optic to the detector by an amount to bring the interference pattern, in the direction transverse to the cyclic path, to a focus offset from the detector.

11. The common path interferometer of claim 10, wherein the offset is configured to bring the interference pattern to a focus in front of the detector.

12. The common path interferometer of claim 10, wherein the input optic is configured to focus, in the direction transverse to the cyclic path, the interference pattern to a focal plane offset and substantially parallel to the detector.

13. The common path interferometer of claim 1, wherein the mirror regions in combination are arranged to focus, in the direction of the plane of the cyclic path, the beam portions to a different position than that provided by the input optic in a direction transverse to the plane of the cyclic path.

14. The common path interferometer of claim 13, wherein the mirror regions are arranged to focus the beam portions to produce a pair of foci such that the focus of the first beam portion is at a different position to the second beam portion.

15. The common path interferometer of claim 14, wherein the detector is arranged such that the detector surface is located at the crossing point of the centres of the beam portions emanating from the pair of foci.

16. The common path interferometer of claim 1, wherein the input optic is a curved mirror to provide the convergence to modify the extent, relative to the input beam and orthogonally to the plane of the cyclic path, of the interference pattern at the detector surface.

17. The common path interferometer of claim 16, wherein the curved mirror is curved transversely to the plane of the cyclic path.

18. The common path interferometer of claim 16, wherein the input mirror is arranged facing towards the detector.

19. The common path interferometer of claim 16, wherein the input mirror is arranged such that the line of focus provided by the input mirror is substantially parallel or substantially coincident with the plane of the detector surface.

20. The common path interferometer of claim 16, wherein the input mirror and detector are arranged such that the angles of incidence at the input mirror and at the detector are substantially the same.

21. The common path interferometer of claim 20, wherein the angles of incidence are in the range 20 to 25°.

22. The common path interferometer of claim 16, wherein the angular orientations of the input mirror and the detector are symmetric about the line of division of the beam into first and second beam portions.

23. The common path interferometer of claim 16, wherein the input mirror is arranged such that the direction of the beam on arrival at the input mirror is opposite to that of the direction of the beam on arrival at the detector.

24. The common path interferometer of claim 16, wherein the input mirror is a concave cylindrical mirror or a toroidal mirror.

25. The common path interferometer of claim 24, wherein the concave cylindrical mirror is arranged to receive the input beam at non-normal angle of incidence such that the field fronts of the beam arrive at the mirror surface with first portions of the field front arriving before second portions, and the variation in focal length of the cylindrical mirror is such that the region of the cylindrical mirror receiving the first portions of the field front is of a greater radius of curvature than the region of the mirror receiving the second portions of the field front.

26. The common path interferometer of claim 1, wherein the input optic is a lens configured to provide convergence to reduce the extent orthogonally to the plane of the cyclic path of the interference pattern at the detector surface.

27. The common path interferometer of claim 26, wherein the lens has thickness or curvature varying across a width direction, the width direction being in the plane of the cyclic path.

28. The common path interferometer of claim 26, wherein the lens is a cylindrical or biconic lens.

29. The common path interferometer of claim 26, wherein the lens has curvature transversely to the plane of the cyclic path.

30. The common path interferometer of claim 26, wherein the lens has its curved surface facing towards the detector.

31. The common path interferometer of claim 26, wherein the lens is a plano-convex cylindrical or biconic lens.

32. The common path interferometer of claim 26, wherein the lens is arranged to receive the input beam at a normal angle of incidence, and the focal length of the lens varies across the lens in a direction in the plane of the cyclic path.

33. The common path interferometer of claim 1, wherein the beamsplitter is configured to recombine the first and second beam portions to form the interference pattern at the detector surface.

34. The common path interferometer of claim 1, wherein the at least two mirror regions curved in the plane of the cyclic path are curved to provide convergence of the extent of the first and second beam portions within the plane of the cyclic path.

35. The common path interferometer of claim 34, wherein the at least two mirror regions curved in the plane of the cyclic path are curved to bring the first and second beam portions to a focus before reaching the detector surface.

36. The common path interferometer of claim 34, wherein the at least two mirror regions curved in the plane of the cyclic path are curved to bring the first and second beam portions to a focus after each of the beam portions has been reflected from at least one of the at least two mirror regions.

37. The common path interferometer claim 1, wherein the path difference across the detector surface between the first and second beam portions varies monotonically.

38. The common path interferometer of claim 1, wherein the detector comprises a two-dimensional pixel array.

39. The common path interferometer of claim 38, further comprising readout circuitry to readout pixel data from the pixel array, the readout circuitry configured to readout only a selected subset of the pixels in the array in a readout phase.

40. A spectrometer comprising the interferometer of claim 1, further comprising an analyser arranged to provide an indication of wavelengths present in the input beam based on a Fourier transform of the interference pattern.

41. The common path interferometer of claim 1, wherein the input optic configured to provide convergence to modify the extent, relative to the input beam and transversely to the plane of the cyclic path, of the interference pattern at the detector surface is configured to reduce the extent, relative to the input beam and transversely to the plane of the cyclic path, of the interference pattern at the detector surface.

42. A common path interferometer configured to divide an input beam into first and second beam portions and direct the first and second beam portions in counter-propagating directions around a cyclic path to form an interference pattern between the first and second portions at a detector surface, the common path interferometer comprising:
- a beam splitter configured to divide the input beam into the first and second beam portions;
- a detector having a detector surface;
- at least two mirror regions curved in a plane of the cyclic path, the cyclic path being defined by the at least two mirror regions and the beam splitter such that the interference pattern represents path difference variations between the first and second beam portions across the detector surface in the plane of the cyclic path; and
- an input optic for receiving the input beam and directing the input beam to the beam splitter for division into the first and second beam portions, the input optic configured to provide convergence to the modify the extent, relative to the input beam and transversely to the plane of the cyclic path, of the interference pattern at the detector surface,
- wherein the input optic is configured such that a line of focus provided by the input optic is substantially parallel or substantially coincident with the plane of the detector surface.

43. The common path interferometer of claim 42, wherein the input optic is a mirror.

44. A common path interferometer configured to divide an input beam into first and second beam portions and direct the first and second beam portions in counter-propagating directions around a cyclic path to form an interference pattern between the first and second portions at a detector surface, the common path interferometer comprising:
- a beam splitter configured to divide the input beam into the first and second beam portions;
- a detector having a detector surface;
- at least two mirror regions curved in a plane of the cyclic path, the cyclic path being defined by the at least two mirror regions and the beam splitter such that the interference pattern represents path difference variations between the first and second beam portions across the detector surface in the plane of the cyclic path; and
- an input optic for receiving the input beam and directing the input beam to the beam splitter for division into the first and second beam portions, the input optic configured to modify by expanding the extent, relative to the input beam and transversely to the plane of the cyclic path, of the interference pattern at the detector surface,
- wherein the input optic is configured to provide expansion substantially only in a direction transverse to the plane of the cyclic path, whereas the two mirror regions curved in the plane of the cyclic path provide convergence substantially only in a direction parallel to the plane of the cyclic path.

* * * * *